US012115797B2

(12) United States Patent
De Meutter et al.

(10) Patent No.: US 12,115,797 B2
(45) Date of Patent: Oct. 15, 2024

(54) MANUFACTURING METHODS OF PRINTED CORRUGATED CARDBOARD

(71) Applicant: AGFA NV, Mortsel (BE)

(72) Inventors: Stefaan De Meutter, Mortsel (BE); Jens Lenaerts, Mortsel (BE)

(73) Assignee: Agfa NV, Mortsel (BE)

( * ) Notice: Subject to any disclaimer, the term of this patent is extended or adjusted under 35 U.S.C. 154(b) by 190 days.

(21) Appl. No.: 17/762,444

(22) PCT Filed: Sep. 10, 2020

(86) PCT No.: PCT/EP2020/075367
§ 371 (c)(1),
(2) Date: Mar. 22, 2022

(87) PCT Pub. No.: WO2021/058295
PCT Pub. Date: Apr. 1, 2021

(65) Prior Publication Data

US 2023/0001704 A1 Jan. 5, 2023

(30) Foreign Application Priority Data

Sep. 25, 2019 (EP) .................................... 19199525

(51) Int. Cl.
*B41J 2/21* (2006.01)
*B41M 5/00* (2006.01)
(Continued)

(52) U.S. Cl.
CPC .............. *B41J 2/21* (2013.01); *B41M 5/0047* (2013.01); *B31B 50/88* (2017.08); *B31B 2120/70* (2017.08)

(58) Field of Classification Search
CPC .......................................................... B41J 2/18
See application file for complete search history.

(56) References Cited

U.S. PATENT DOCUMENTS 6,143,807 A * 11/2000 Lin ........................ H01R 31/02 106/31.89
2002/0081400 A1* 6/2002 Gocho ..................... B41M 5/36 428/29
(Continued)

FOREIGN PATENT DOCUMENTS

EP 3360934 A1 8/2018
JP 2007-152808 A 6/2007
(Continued)

OTHER PUBLICATIONS

European Patent Office, International Search Report in International Patent Application No. PCT/EP2020/075367, mailed Dec. 8, 2020, 3 pp.
(Continued)

*Primary Examiner* — Shelby L Fidler
(74) *Attorney, Agent, or Firm* — Leydig, Voit & Mayer, Ltd.

(57) ABSTRACT

A manufacturing method of printed corrugated cardboard comprising the steps of: a) providing a paper liner board (23) with an ink receiving layer; and b) inkjet printing an image with one or more pigmented aqueous inkjet inks on the ink receiving layer using piezoelectric through-flow print heads (25) having nozzles with an outer nozzle surface NS smaller than 500 µm2; wherein the one or more pigmented aqueous inkjet inks contain water in an amount of A wt % defined by: wherein the wt % is based on the total weight of the aqueous inkjet ink; wherein sqrt(NS) represents the square root of the outer nozzle surface area NS; and wherein A wt %≥40 wt %.

12 Claims, 3 Drawing Sheets

(51) Int. Cl.
*B31B 50/88* (2017.01)
*B31B 120/70* (2017.01)

(56) References Cited

U.S. PATENT DOCUMENTS

| | | | | |
|---|---|---|---|---|
| 2007/0175350 | A1* | 8/2007 | Crum | B65D 5/4212 101/483 |
| 2011/0069118 | A1* | 3/2011 | Ohzeki | B41J 2/14233 347/44 |
| 2017/0297354 | A1* | 10/2017 | Van Den Bergen | B44C 5/04 |
| 2019/0062579 | A1 | 2/2019 | Loccufier | |

FOREIGN PATENT DOCUMENTS

| | | | |
|---|---|---|---|
| WO | WO 2015/140097 | A1 | 9/2015 |
| WO | WO 2016/113190 | A1 | 7/2016 |

OTHER PUBLICATIONS

European Patent Office, Written Opinion in International Patent Application No. PCT/EP2020/075367, mailed Dec. 8, 2020, 6 pp.

* cited by examiner

MANUFACTURING METHODS OF PRINTED CORRUGATED CARDBOARD

CROSS-REFERENCE TO RELATED APPLICATIONS

This patent application is the U.S. national phase of copending International Patent Application No. PCT/EP2020/075367, filed Sep. 10, 2020, which claims the benefit of European Patent Application No. 19199525.7, filed Sep. 25, 2019.

TECHNICAL FIELD

The present invention relates to manufacturing methods of printed corrugated cardboard.

BACKGROUND ART

Corrugated cardboard is a preferred packaging material as it is low cost and lightweight. Lightweight packaging material reduces transportation costs and facilitates the handling during delivery to the customer. A further benefit is that corrugated cardboard boxes are stackable, making them easy to store and transport.

Corrugated cardboard is a packaging material formed by gluing one or more fluted sheets of paperboard (called corrugating medium) to one or more flat sheets of linerboard (called facings). It comes in four common types: (1) Single face: one fluted sheet glued to one facing (total two sheets); (2) Single wall: one fluted sheet sandwiched between two facings (total three sheets), also called double face or single ply; (3) Double wall: one single-face glued to one single wall so that two fluted sheets are alternatively sandwiched between three flat sheets (total five sheets), also called double cushion or double ply; and (4) Triple wall: two single-face glued to one single wall so that three fluted sheets are alternatively sandwiched between four flat sheets (total seven sheets), also called triple ply.

Traditionally, images have been printed on corrugated cardboard using flexographic and offset printing technologies. With the role of e-commerce becoming more and more significant, the direct contact of the seller with the customer decreases. Companies are investigating ways to maintain and enhance customer experience and customer engagement. The packaging is becoming the way to realize this by customized or even personalized messaging. Such messaging is however extremely expensive to print by flexography or offset. A preferred alternative technology is inkjet that has no-press set-up time (no plates and plate changes) and allows for short lead times.

As packaging can have a significant influence on consumer purchasing, there is a demand for increased image quality. For example, EP 3360934 A (FUJIFILM) discloses an inkjet ink set for corrugated cardboard that comprises inks of five colors with different color tones, while generally four-color ink sets composed of a yellow (Y) ink, a magenta (M) ink, a cyan (C) ink, and a black (K) ink have been hitherto used.

In addition to image quality, also a high productivity is required in an industrial environment. Reliability of inkjet printing, especially when using single-pass inkjet printing systems is of the uttermost importance. Single pass inkjet machines run at very high speeds, some even up to 150 m/min. For example, the clogging of one or more nozzles by inkjet ink results in line artefacts in the printed image, waste of materials and interruptions of the printing process. This represents not only a financial loss, but also a loss in productivity.

There is still a need for improved methods for manufacturing printed corrugated cardboard in an economical manner with an inkjet printing process having high reliability and improved image quality.

SUMMARY OF INVENTION

In order to overcome the problems described above, preferred embodiments of the present invention have been realized with a method of manufacturing printed corrugated cardboard as defined in claim 1.

It was surprisingly found that for certain piezoelectric print heads a relation exists between the outer nozzle surface area of the nozzles in a print head and the water content in the aqueous inkjet ink, so that reliable inkjet printing is achieved.

It is an objection of the invention to provide an improved method of manufacturing printed corrugated cardboard using specific aqueous inkjet inks in piezoelectric through-flow print heads having nozzles with an outer nozzle surface area NS smaller than 500 $\mu m^2$.

Another object of the invention is to provide a combination of piezoelectric through-flow print heads having nozzles with an outer nozzle surface area NS smaller than 500 $\mu m^2$ and specific pigmented aqueous inkjet inks from an aqueous inkjet ink set for producing printed corrugated cardboard with high image quality and reliability.

These and other objectives will become apparent from the detailed description hereinafter.

BRIEF DESCRIPTION OF DRAWINGS

FIG. 2.B shows a cross-section of a through flow print head, where the print head walls (10) encompass an ink channel (14) supplied with inkjet ink via an ink inlet (12) and which continuously leaves the ink channel (14) via an ink outlet (13) and only when required leaves the ink channel (14) as an ejected ink droplet (17) via ink ejection (11) through a nozzle (16) in the nozzle plate (15) of the print head. The piezo element of the print head for forming the ejected droplet (17) is not shown in the schematic drawing.

FIG. 3.B shows a top view taken from the inside of a print head and showing the area around a nozzle (16) in a nozzle plate (15) attached to print head wall (10) with the nozzle (16) having an outer nozzle diameter (19) that is smaller than the inner nozzle diameter (18).

DESCRIPTION OF EMBODIMENTS

Definitions

Figure 1:
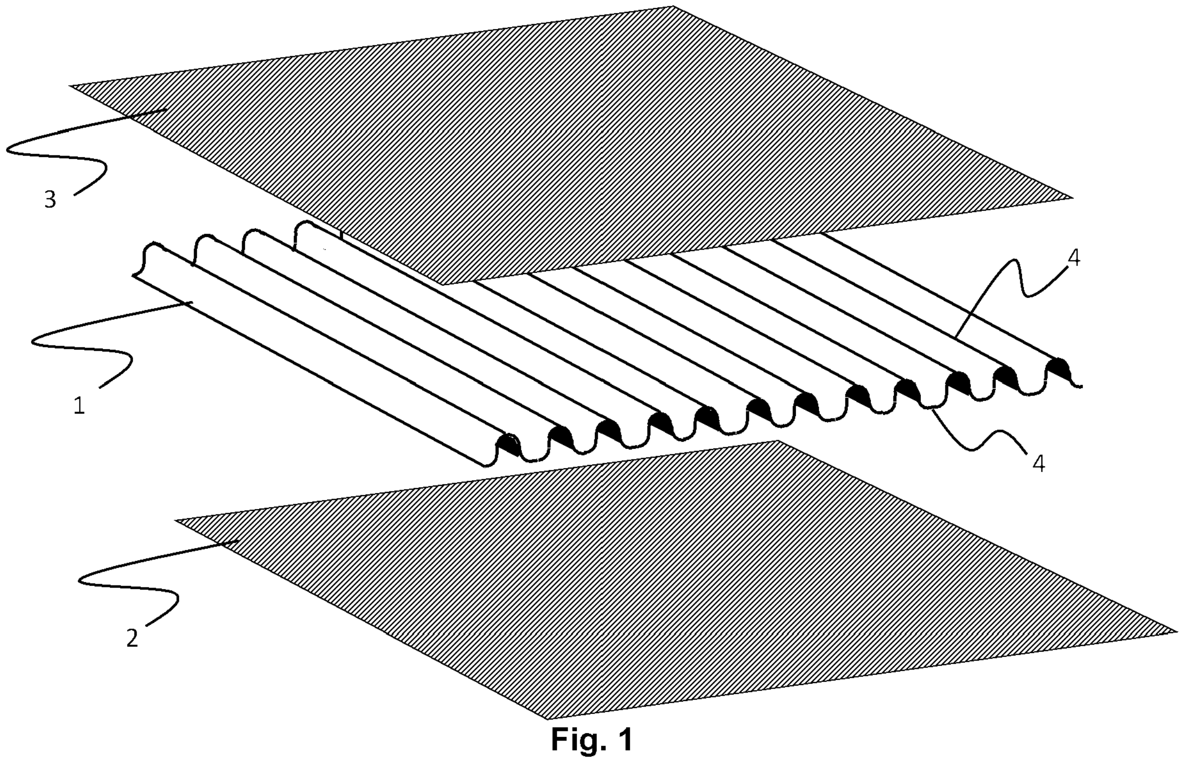
FIG. 1 illustrates the structure of a corrugated cardboard formed by gluing a fluted paperboard (1) with glue (4) to a paper linerboard (2) and a paper linerboard (3).

The term "water-soluble" means a property of being soluble in water at a certain concentration or higher. A property by which 5 g or more (more preferably 10 g or more) dissolves in 100 g of water at 25° C. is preferred.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted aralkyl group is preferably phenyl group or naphthyl group including one, two, three or more $C_1$ to $C_6$-alkyl groups.

Unless otherwise specified a substituted or unsubstituted alkaryl group is preferably a $C_1$ to $C_6$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more substituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —$NO_2$.

Manufacturing Methods

A preferred embodiment of the invention is a manufacturing method of printed corrugated cardboard comprising the steps of: a) providing a paper liner board (23) with an ink receiving layer; and b) inkjet printing an image with one or more pigmented aqueous inkjet inks on the ink receiving layer using piezoelectric through-flow print heads (25) having an outer nozzle surface NS smaller than 500 $\mu m^2$; wherein the one or more pigmented aqueous inkjet inks contain water in an amount of A wt % defined by Formula (I):

$$100\text{ wt }\%-\text{sqrt(NS)}\times 3.8\text{ wt }\%/\mu m \leq A\text{ wt }\% \leq 100\text{ wt }\%-\text{sqrt(NS)}\times 2.2\text{ wt }\%/\mu m \quad \text{Formula (I)}$$

wherein the wt % is based on the total weight of the aqueous inkjet ink; wherein sqrt(NS) represents the square root of the outer nozzle surface area NS; and wherein A wt %≥40 wt %. An amount of 40 wt % is required in order to avoid mist formation and have acceptable drying speed. Preferably A wt %≥44 wt %, more preferably A wt %≥45 wt %.

The manufacturing method preferably includes a step c) of laminating the inkjet printed paper linerboard onto a fluted paperboard of a corrugated cardboard. This method, visualized by FIG. 5, is advantageous for image quality. In the alternative method of printing directly on the corrugated cardboard, visualized by FIG. 4, the flexographic printing rolls (24, 26) may create a so-called washboard effect by the pressure applied to the corrugated card board. The latter is not obtained when the flexographic printing rolls (24, 26) apply the ink receiving layer and protective varnish layer onto an inkjet printed paper linerboard, which is then afterwards glued to a single face. The smaller pressure applied by lamination rollers is homogeneously applied and does not create a washboard effect, contrary to flexographic printing rolls which can print a layer image-wise.

In a preferred embodiment of the manufacturing method, the inkjet printing is performed according to a single pass printing process. This results in a much higher productivity.

The manufacturing method preferably also includes a step of applying a protective varnish layer on the inkjet printed image. Such a protective varnish layer generally also increases the glossiness of the inkjet printed image, which is beneficial for the image quality.

In a particularly preferred embodiment of the manufacturing method, the ink receiving layer and/or the protective varnish layer are applied by flexographic printing. This is beneficial for productivity. The ink receiving layer and protective varnish layer can also be applied by coating, e.g. using a bar-coater or a knife coater. However, coating methods generally create more waste as it takes some time to reach a stable coating state of good quality. Flexographic printing has the advantage that the flexographic printing rolls can be easily incorporated in the inkjet printing system and operated at the same printing speed.

In a particularly preferred embodiment, the manufacturing method of printed cardboard according the invention is used for manufacturing corrugated cardboard packaging boxes wherein the inkjet printed image is located on the inside of corrugated cardboard packaging box. Such a packaging box may be inside-only print, or alternatively the outside of the packaging box may be printed, for example, with the brand of the e-commerce company selling the goods for a manufacturer.

By printing inside the box, or inside-only print, it is chosen to skip printing customized or personalized messaging for enhancing customer experience and customer engagement on the exterior of the packaging box. The result of printing inside the box is a great unboxing experience offering a wow factor by cleverly placed branding and messaging that can surprise and delight customers. In addition, it reduces theft and provides privacy. Since printing inside is nondescript, people may be less likely to steal a package that doesn't reveal its contents. Furthermore, many delivered packages end up with wear and tear on the outside. The unscathed interior will be the focus when the customer opens it.

In a preferred embodiment of the invention, the above described manufacturing method of printed cardboard is used for manufacturing a corrugated cardboard packaging box, wherein the inkjet printed image is located on the inside of the corrugated cardboard packaging box.

When inkjet printing an image, the one or more pigmented aqueous inkjet inks are preferably not of the aqueous UV curable inkjet ink type. This means that the one or more pigmented aqueous inkjet inks do not contain a photoinitiator or polymerizable compounds, which can migrate into to content (e.g. foodstuffs) of the corrugated cardboard packaging box and thus create a health risk, especially when the inkjet printed image is located on the inside of the corrugated cardboard packaging box.

Corrugated Cardboard

Cardboard can come in a variety of constructions, such as e.g. honeycomb cardboard. However, for easy creasing into packaging boxes a cardboard using a paper fluting medium is used. Such a cardboard is referred to as corrugated cardboard. The fluted paperboard provides strength to the cardboard. This is important for deliverability, as if merchandise doesn't arrive intact in the hands of the customers, then a company risks its reputation with them.

The preferred corrugated cardboard in the present invention is single wall or double wall, more preferably single wall corrugated cardboard as this is sufficiently strong and easy to crease. Single face corrugated cardboard generally has insufficient strength to hold the merchandise articles, while triple wall cardboard is often more difficult to crease into a packaging box.

The paper board used in corrugated cardboard, such as Kraft paper, has usually a brownish colour. In a preferred embodiment of the manufacturing method described above, the paper liner board (23) in FIGS. 4 and 5 has a white colour. By having a white background, an enhanced image quality is obtained. Inkjet printed colours on the white paper liner board (23) have a much higher vibrancy then when printed on brownish Kraft paper linerboard. The white colour background also contributes to the customer experience as the customer regards this as a more luxurious product. Alternatively, the white background may be applied as a layer by coating or printing prior to inkjet printing. However, a white paper liner board is preferred, as this enhances reliability of the printing process by eliminating possible problems that may occur during coating or printing the white layer.

Suitable paper liner board having a white background include white top kraftliner and white coated kraftliner.

In the preferred embodiment of manufacturing printed corrugated cardboard, as illustrated by FIG. 5, the single face corrugated cardboard is used in the form of a roll instead of sheets. The use of single face supplied in rolls contributes to gains in productivity and reliability, as gluing the inkjet printed paper linerboard onto the single face can go faster with less errors, than it would with individual single face sheets.

Figure 4:
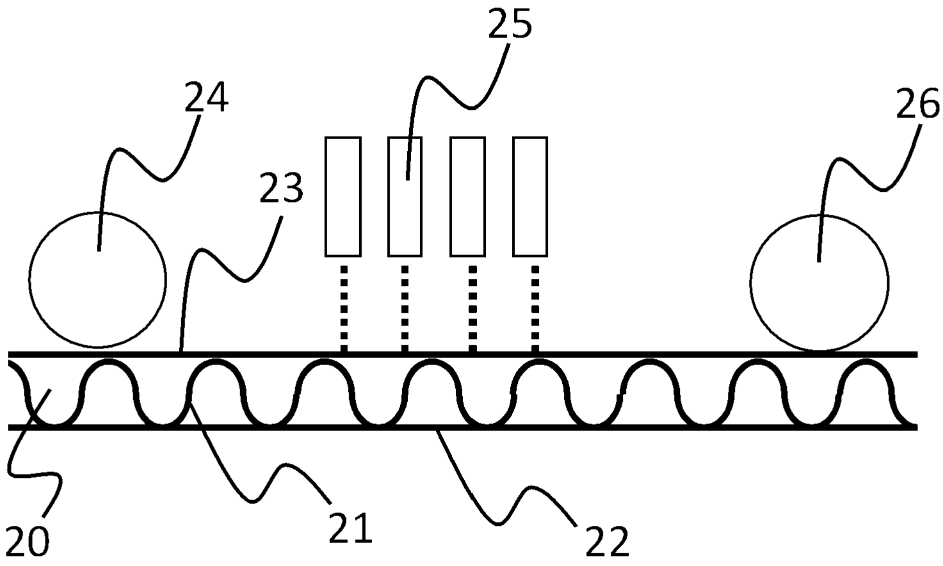
FIG. 4 shows an embodiment of a method for manufacturing printed corrugated cardboard, wherein a single wall corrugated cardboard (20) having a fluted paperboard (21) between two paper linerboards (22, 23) is first printed by a flexographic printing roll (24) with an ink receiver layer, then printed by inkjet print heads (25) with an image and finally printed by a second flexographic printing roll (26) with a protective varnish layer.
Figure 5:
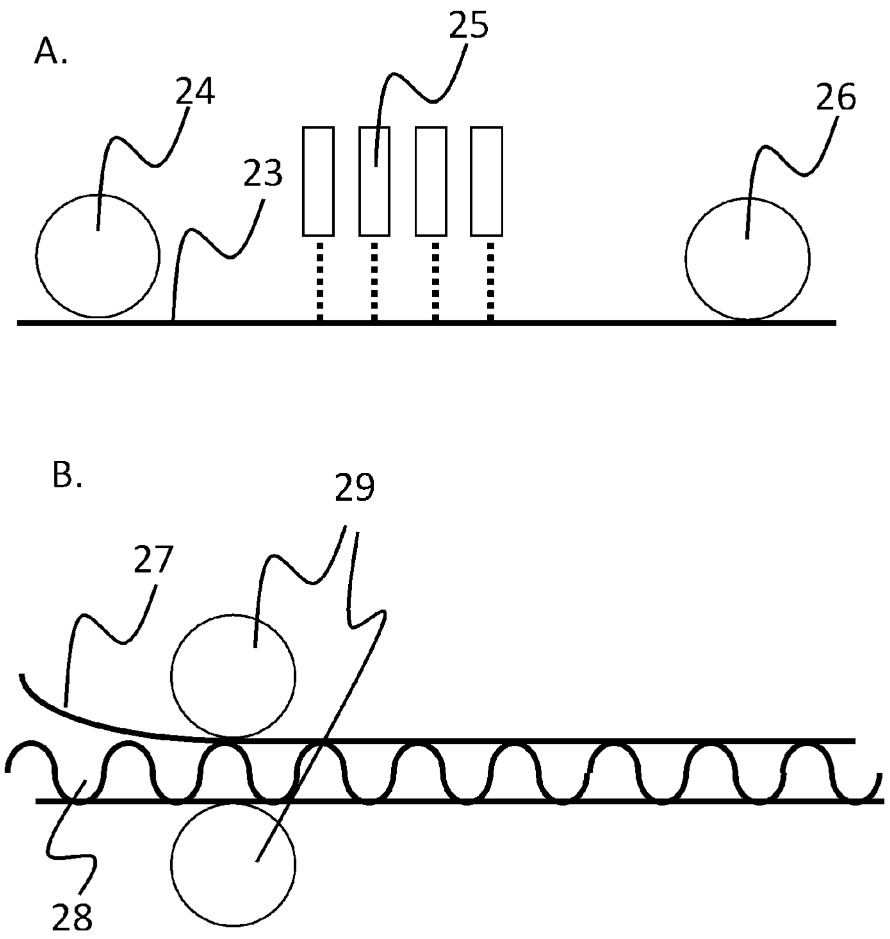
FIG. 5 shows a preferred embodiment of a method for manufacturing printed corrugated cardboard including an inkjet printing step A and a lamination step B. In step A, a linerboard (23) is first printed by a flexographic printing roll (24) with an ink receiver layer, then printed by inkjet print heads (25) with an image and finally printed by a second flexographic printing roll (26) with a protective varnish layer. In step B, the inkjet printed paper linerboard (27) obtained from step A is laminated by two lamination rollers (29) onto a single face corrugated cardboard (28) using glue.
Figure 6:
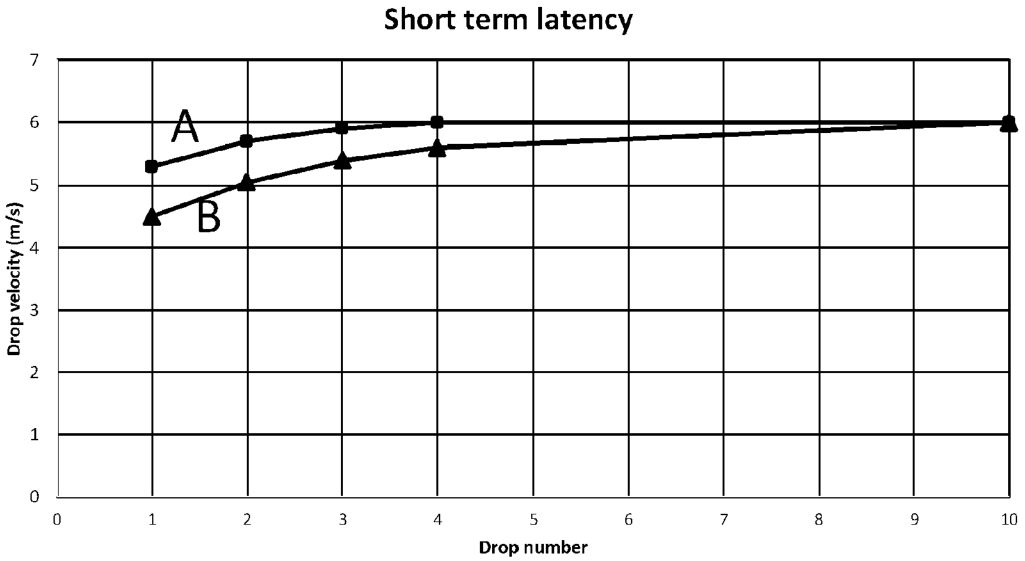
FIG. 6 shows a graph obtained by determining the short term latency after 0.5 s for two inks A and B.

Also the corrugated cardboard as used in FIG. 4 is preferably used in the form of corrugated rolls. Alternatively, a corrugated cardboard can be used in the form of a fanfold. Fanfold is a continuous sheet of corrugated board that has been scored and folded like a fan.

Corrugated board in rolls usually has an elastic property due to a special soft inner liner allowing it to be delivered in rolls. Corrugated rolls are a productive solution for customers who have many different sized products and are using a large number of different packaging specifications.

Fanfold provides a cost effective solution by lowering inventory, as fewer sizes need to be held in stock. For manual packaging processes, the board can easily be scored along its length, making it easy to fold to the required size. Special fanfold cutting machines are also available allowing to create made to measure packs on the premises of the customer.

Combinations of Inkjet Inks and Print Heads

A preferred embodiment of the invention is a combination for manufacturing printed corrugated cardboard including:

a) piezoelectric through-flow print heads having nozzles with an outer nozzle surface area NS smaller than 500 $\mu m^2$; and b) aqueous inkjet inks from an aqueous inkjet ink set, wherein the aqueous inkjet ink set comprises:

a cyan aqueous inkjet ink containing a beta-copper phthalocyanine pigment;

a magenta or red aqueous inkjet ink containing a pigment selected from the group consisting of C.I. Pigment Red 57/1, C.I. Pigment Red 122, C.I. Pigment Violet 19 and mixed crystals thereof;

a yellow aqueous inkjet ink containing a pigment selected from C.I. Pigment Yellow 74, C.I. Pigment Yellow 138, C.I. Pigment Yellow 151 and mixed crystals thereof; and a black aqueous inkjet ink containing a carbon black pigment; wherein the aqueous inkjet inks contain water in an amount of A wt % defined by Formula (I):

$$100\text{ wt }\%-\text{sqrt(NS)}\times 3.8\text{ wt }\%/\mu m \leq A\text{ wt }\% \leq 100\text{ wt }\%-\text{sqrt(NS)}\times 2.2\text{ wt }\%/\mu m \quad \text{Formula (I)}$$

wherein the wt % is based on the total weight of the aqueous inkjet ink;

wherein sqrt(NS) represents the square root of the outer nozzle surface area NS; and wherein A wt %≥40 wt %.

The above combination of piezoelectric through-flow print heads and aqueous inkjet inks is included in an inkjet printing device, preferably a single pass inkjet printing device.

Suitable inkjet inks and piezoelectric print heads are described in more detail here below.

Piezoelectric Print Heads

Two aspects of the piezoelectric print heads were found to be necessary for an improved reliability of inkjet printing: 1) a through-flow type of piezoelectric print head and 2) an outer nozzle surface area smaller than 500 $\mu m^2$.

Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head.

Figure 2:
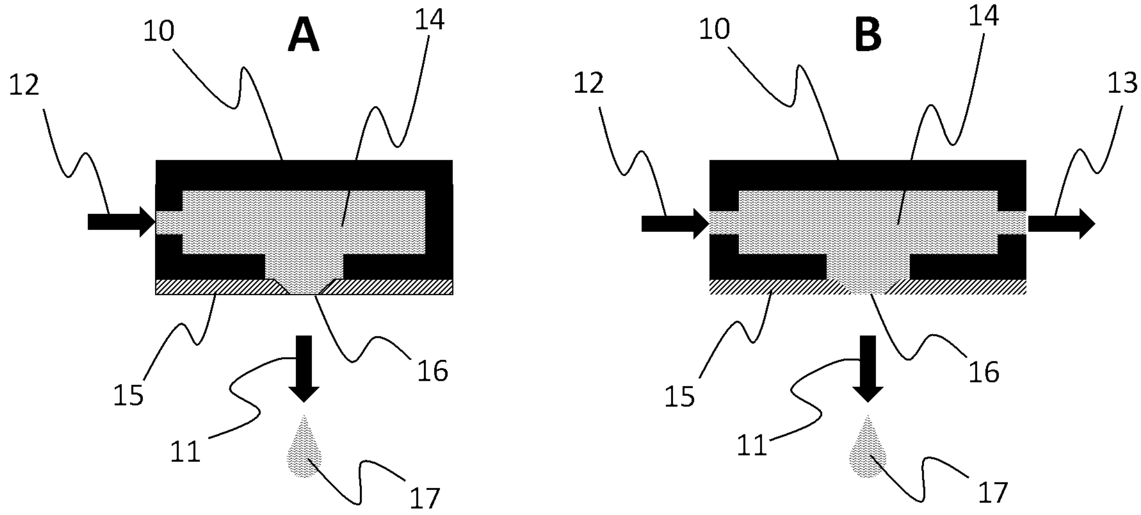
FIG. 2.A shows a cross-section of an end shooter print head, where the print head walls (10) encompass an ink channel (14) supplied with inkjet ink via an ink inlet (12), which can only leave the print head as an ejected ink droplet (17) via ink ejection (11) through a nozzle (16) in the nozzle plate (15) of the print head. The piezo element of the print head for forming the ejected droplet (17) is not shown in the schematic drawing.

The difference between piezoelectric through-flow print heads and other piezoelectric print heads is shown by FIG. 2. In an end shooter print head, like the one shown in FIG. 2.A and often also called a single ended print head, the ink flows via an ink inlet (12) of the print head into the ink channel (14) and can only exit through a nozzle (16). In a through flow print head, like the one shown in FIG. 2.B and often also called a recirculating print head, the ink flows continuously via an ink inlet (12) through the ink channel (14) and exits the nozzle (16) only when required, otherwise the ink exits the ink channel via an ink outlet (13) of the print head.

Commercial examples of end shooter print heads are, for example, the piezoelectric print heads Gen5 and Gen5S from RICOH and KJ4B from KYOCERA. Suitable piezoelectric through-flow print heads for obtaining the invention are the print heads Samba G3L and G5L from FUJI DIMATIX and the 5601 print head from XAAR.

The nozzle in a nozzle plate usually has an outer nozzle aperture which is smaller than the inner nozzle aperture. The inner nozzle aperture is the aperture facing the ink channel, while the outer nozzle aperture faces the outside environment of the print head. The shape of the nozzle aperture is usually circular, oval, square or rectangular, but may have other more complex shapes.

Figure 3:
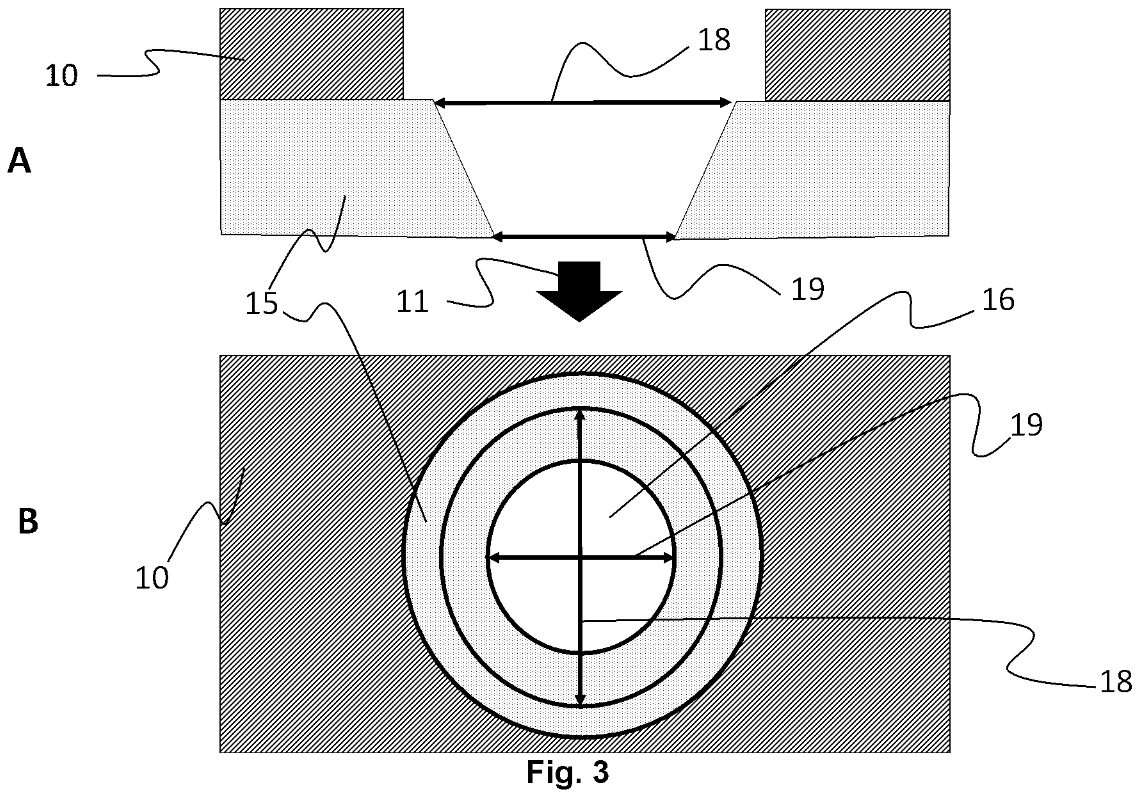
FIG. 3.A shows a cross-section of the area around a nozzle (16) in a nozzle plate (15) attached to print head wall (10), wherein the nozzle (16) has an outer nozzle diameter (19), through which the ink ejection (11) takes place, and a larger inner nozzle diameter (18).

The nozzle surface area NS is calculated based on the dimensions of the outer nozzle using well-known mathematical formulas for surface areas. For example, in case of a circular nozzle, the nozzle surface area NS is calculated by the formula: $NS=\pi\times r^2$, wherein the radius r is half of the outer nozzle diameter (19) in FIG. 3.

The above described aqueous inkjet ink set is combined with piezoelectric through-flow print heads having nozzles with an outer nozzle surface area NS smaller than 500 $\mu m^2$. The outer nozzle surface area NS is preferably between 100 and 300 $\mu m^2$, more preferably between 150 and 250 $\mu m^2$. In these ranges, the print heads can produce images of excellent image quality.

The native drop size is the drop volume of a single droplet in normal print conditions, this means standard waveforms and reference voltage. In the present invention, the native drop size of the piezoelectric through-flow print heads is preferably between 2.0 and 5.5 pL, more preferably between 2.2 and 5.0 pL. In these small native drop size ranges, it is possible to somewhat mask line artefacts caused by failing nozzles, thus leading to larger productivity.

Aqueous Inkjet Ink Sets

The inkjet inks contain a pigment as colorant. Colour pigments have a higher water fastness than dyes. This is of importance as during transport and delivery, an inkjet printed image may be exposed to rain.

The pigmented aqueous inkjet inks preferably form an inkjet ink set. A preferred ink set is a CMYK inkjet ink set. Such an ink set provides a high colour gamut that is beneficial for image quality. The CMYK-inkjet ink set may also be extended with extra inks such as red, green, blue, and/or orange to further enlarge the colour gamut of the image. The inkjet ink set may also be extended by the combination of full density inkjet inks with light density inkjet inks. The combination of dark and light colour inks and/or black and grey inks improves the image quality by a lowered graininess.

In a particularly preferred embodiment, the pigmented aqueous inkjet ink set includes:

a) a cyan aqueous inkjet ink containing a beta-copper phthalocyanine pigment;

b) a magenta or red aqueous inkjet ink containing a pigment selected from the group consisting of C.I. Pigment Red 57/1, C.I. Pigment Red 122, C.I. Pigment Violet 19 and mixed crystals thereof;

c) a yellow aqueous inkjet ink containing a pigment selected from C.I. Pigment Yellow 74, C.I. Pigment Yellow 138, C.I. Pigment Yellow 151 and mixed crystals thereof; and d) a black aqueous inkjet ink containing a carbon black pigment.

The aqueous inkjet inks preferably have a surface tension between 18.0 and 28.0 mN/m at 25° C. An aqueous inkjet ink with a surface tension smaller than 18.0 mN/m at 25° C. generally requires a high amount of surfactant, which may cause problems of foaming. A surface tension greater than 28.0 mN/m at 25° C. may cause fouling of the nozzle plate of the print head and/or wetting of ink circuit in the print head.

The viscosity of the inkjet inks is preferably in the range of 1.0 mPa·s to 15.0 mPa·s, more preferably 2.0 mPa·s to 10.0 mPa·s at 32° C. at a shear rate of 1,000 $s^{-1}$. Most preferably the one or more pigmented aqueous inkjet inks used in the manufacturing method of the invention have a viscosity between 3.0 and 8.0 mPa·s, more preferably between 3.5 and 6.0 mPa·s at 32° C. at a shear rate of 1,000 $s^{-1}$. It was found that such a viscosity provides an increased reliability to the inkjet printing process.

Colour Pigments

The colorant in the one or more aqueous inkjet inks includes a colour pigment.

The one or more pigmented aqueous inkjet inks preferably contain a dispersant, more preferably a polymeric dispersant, for dispersing the pigment. They may contain a dispersion synergist to improve the dispersion quality and stability of the ink.

The colour pigments may be chosen from those disclosed by HERBST, Willy, et al. Industrial Organic Pigments, Production, Properties, Applications. 3rd edition. Wiley—VCH, 2004. ISBN 3527305769.

The colour pigment can be selected, in accordance with a colour of an image to be formed, preferably an inkjet ink set contains inks having respectively a yellow pigment, a red or magenta pigment, a blue or cyan pigment and a black pigment.

Preferred examples of the yellow pigment include C.I. Pigment Yellow (hereinafter referred to as "PY") 1, PY3, PY12, PY13, PY14, PY17, PY34, PY35, PY37, PY55, PY74, PY81, PY83, PY93, PY94, PY95, PY97, PY108, PY109, PY110, PY137, PY138, PY139, PY151, PY153, PY154, PY155, PY157, PY166, PY167, PY168, PY180, PY185 and PY193.

Preferred examples of the red or magenta pigment include C.I. Pigment Red (hereinafter referred to as "PR") 3, PRS, PR19, PR22, PR31, PR38, PR43, PR48:1, PR48:2, PR48:3, PR48:4, PR48:5, PR49:1, PR53:1, PR57:1, PR57:2, PR58:4, PR63:1, PR81, PR81:1, PR81:2, PR81:3, PR81:4, PR88, PR104, PR108, PR112, PR122, PR123, PR144, PR146, PR149, PR166, PR168, PR169, PR170, PR177, PR178, PR179, PR184, PR185, PR208, PR216, PR226, and PR257, and C.I. Pigment Violet (hereinafter referred to as "PV") 3, PV19, PV23, PV29, PV30, PV37, PV50 and PV88, and C.I. Pigment Orange (hereinafter referred to as "PO") 13, PO16, PO20 and PO36.

Preferred examples of the blue or cyan pigment include C.I. Pigment Blue (hereinafter referred to as "PB") 1, PB15, PB15:1, PB15:2, PB15:3, PB15:4, PB15:6, PB16, PB17-1, PB22, PB27, PB28, PB29, PB36, and PB60.

Preferred examples of a green pigment include C.I. Pigment Green (hereinafter referred to as "PG") 7, PG26, PG36 and PG50.

Preferred examples of a black pigment include C.I. Pigment Black (hereinafter referred to as "PBk") 7, PBk26 and PBk28. For the black ink, suitable pigment materials include carbon blacks such as Regal™ 400R, Mogul™ L, Elftex™ 320 from Cabot Co., or Carbon Black FW18, Special Black™ 250, Special Black™ 350, Special Black™ 550, Printex™ 25, Printex™ 35, Printex™ 55, Printex™ 90, Printex™ 150T from DEGUSSA Co., MA8 from MITSUBISHI CHEMICAL Co.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may be used. For example, the black inkjet ink including a carbon black pigment may further include at least one pigment selected from the group consisting of a blue pigment, a cyan pigment, magenta pigment and a red pigment. It was found that such a more neutral black inkjet ink allowed easier and better colour management.

The pigment particles in the pigmented inkjet ink should be sufficiently small to permit free flow of the ink through the inkjet printing device, especially at the ejecting nozzles. It is also desirable to use sufficiently small particles for maximum colour strength and to slow down sedimentation.

For achieving high printing reliability, the numeric average particle size of the pigment in the pigmented inkjet ink is preferably between 50 nm and 250 nm. More preferably, the numeric average pigment particle size is between 100 nm and 200 nm.

The determination of the numeric average particle size is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis.

The colour pigment is preferably used in the pigmented aqueous inkjet inks in an amount of 0.1 to 10 wt %. Preferably the concentration is 1.5 to 6.0 wt %, and more preferably 2.0 to 5.0 wt % based on the total weight of the pigmented inkjet ink. A pigment concentration of at least 2 wt % is preferred to reduce the amount of inkjet ink needed to produce the desired inkjet image leading to an enhanced productivity as less water and solvent have to be removed by drying. A pigment concentration higher than 5 wt % leads to graininess when light colours have to be printed, which is detrimental to image quality.

Polymeric Dispersants

The aqueous inkjet inks preferably contain a polymeric dispersant for dispersing the pigment. One or more aqueous inkjet inks may also contain a dispersion synergist to further improve the dispersion quality and stability of the ink.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable commercial dispersants are DISPERBYK™ dispersants available from BYK CHEMIE, JONCRYL™ dispersants available from JOHNSON POLYMERS and SOLSPERSE™ dispersants available from ZENECA. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

In a particularly preferred embodiment, the polymeric dispersant used in the pigmented aqueous inkjet inks is a copolymer comprising between 3 and 11 mol % of a long aliphatic chain (meth)acrylate wherein the long aliphatic chain contains at least 10 carbon atoms.

The long aliphatic chain (meth)acrylate contains preferably 10 to 18 carbon atoms. The long aliphatic chain (meth)acrylate is preferably decyl (meth)acrylate. The polymeric dispersant can be prepared with a simple controlled polymerization of a mixture of monomers and/or oligomers including between 3 and 11 mol % of a long aliphatic chain (meth)acrylate wherein the long aliphatic chain contains at least 10 carbon atoms.

A commercially available polymeric dispersant being a copolymer comprising between 3 and 11 mol % of a long aliphatic chain (meth)acrylate is Edaplan™ 482, a polymeric dispersant from MUNZING.

For dispersing 0.1 Pigment Yellow 150 and mixed crystals thereof, the polymeric dispersant is preferably an acrylic block copolymer dispersant, as very good ink stability has been observed with such a polymeric dispersant. A commercial example is Dispex™ Ultra PX 4575 from BASF.

Aqueous Dispersion Medium

An aqueous inkjet ink contains solid components, such as the colour pigment, and liquid components. The liquid components form the dispersion medium, which in the present invention contains at least water and preferably one or more water-soluble organic solvents. Regarding the water-soluble solvent, known solvents can be used without particular limitations.

When an inkjet print head or certain nozzles thereof are in non-printing mode (printing idle time) then evaporation of the liquid components may take place. Upon activating the print head or the idle nozzles after a prolonged non-printing time, some nozzles can be clogged (=failing nozzles). This phenomenon is called latency. Latency due to evaporation can be addressed by including one or more organic solvents having a higher boiling point than water. However, large amounts of such organic solvents also reduce the productivity as it takes longer time to dry the inkjet printed samples.

Another cause of latency is a sub-optimal dispersion of the colour pigment. Colour pigments are usually dispersed with polymeric dispersants having hydrophobic anchor parts adhering to the hydrophobic surface of the colour pigment particles and hydrophilic parts dissolved in the aqueous dispersion medium for realizing steric stabilization of the colour pigment. The addition of large amounts of organic solvents tend to dissolve the hydrophobic parts from the pigment surface and to reduce the dissolution of the hydrophilic parts of the dispersant, resulting in a precipitation of the pigment.

Usually latency is evaluated on a long term of hours or days. However, there exists also a so-called short term latency, which occurs during printing and is evaluated on a short term of seconds or even fractions of seconds. After a certain print idle time of, for example, half a second, a nozzle tends to fire the first ink droplets at a much lower drop velocity than when in a steady-state of continuously printing ink droplets. This is illustrated by FIG. 4 showing a better short term latency for ink A than for ink B after a printing idle time of 0.5 seconds. The curves for ink A and B are determined by consecutively measuring the drop velocity of the n-th droplet fired by the inkjet print head, with n being 1, 2, 3, 4 and 10.

In the present invention, it was found that the printing reliability of aqueous inkjet inks could be enhanced by controlling the water content in a certain range for piezoelectric through-flow print heads having an outer nozzle surface area NS smaller than 500 $\mu m^2$. Such aqueous inkjet inks contain water in an amount of A wt % defined by Formula (I):

$$100\ \text{wt}\ \% - \text{sqrt(NS)} \times 3.8\ \text{wt}\ \%/\mu m \leq A\ \text{wt}\ \% \leq 100\ \text{wt}\ \% - \text{sqrt(NS)} \times 2.2\ \text{wt}\ \%/\mu m \qquad \text{Formula (I)}$$

wherein the wt % is based on the total weight of the aqueous inkjet ink;

wherein sqrt(NS) represents the square root of the outer nozzle surface area NS; and wherein A wt %≥40 wt %.

Suitable organic solvents include triacetin, N-methyl-2-pyrrolidone, 2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols. Preferred organic solvents are glycerol and 1,2-hexanediol, the latter two were found to be the most effective for improving latency.

Organic solvents are not only included in the aqueous dispersion medium for improving latency. Some organic solvents, even with a lower boiling point than water, may be added to promote dissolution of certain solid components, such as surfactants, dispersants and biocides. However, preferably more than 60 wt %, most preferably 90 to 100 wt % of the organic solvents based on the total weight of the organic solvents present in the aqueous inkjet ink have a boiling point higher than water, more preferably higher than 150° C. at standard atmospheric pressure (1013.25 mbar).

For regulating the viscosity of the aqueous inkjet ink, preferably a polyalkyleneglycol dialkylether represented by Formula (A) is used in the aqueous dispersion medium:

Formula (A)

$$R_1 \!-\!\!\left[ O - Y \right]_n\!\!-\! O - R_2$$

wherein, $R_1$ and $R_2$ are each independently selected from an alkyl group having 1 to 4 carbon atoms; Y represents an ethylene group or a propylene group; and n is an integer selected from 5 to 20. The alkylgroups $R_1$ and $R_2$ of the polyalkyleneglycol dialkylethers according to Formula (A) preferably represent methyl and/or ethyl. Most preferably, the alkylgroups $R_1$ and $R_2$ are both methyl groups.

In a preferred embodiment the polyalkyleneglycol dialkylethers according to Formula (A) are polyethyleneglycol dialkylethers, preferably polyethyleneglycol dimethylethers, as they mix very easily with water to provide an aqueous pigment dispersion.

Instead of pure compounds also a mixture of polyalkyleneglycol dialkylethers may be used. Suitable mixtures of polyalkyleneglycol dialkylethers include mixtures of polyethylene glycol dimethyl ethers having an average molecular weight of at least 200, such as Polyglycol DME 200™, Polyglycol DME 250™ and Polyglycol DME 500™ from CLARIANT. The polyalkyleneglycol dialkylethers used in the aqueous inkjet ink have preferably an average molecular weight between 200 and 800.

Other preferred organic solvents having good water solubility include ethylene glycol, propylene glycol, diethylene glycol, triethylene glycol, dipropylene glycol, 1,3-propanediol, 1,2-butanediol, 2,3-butanediol, 1,3-butanediol, 1,2,3-trihydroxypropane (glycerol), 1,4-butanediol, 2,2-dimethyl-1, 3-propanediol, 2-methyl-1, 3-propanediol, 1,2-pentanediol, 2,4-pentanediol, 2-methyl-2, 4-pentanediol, 1,5-pentanediol, 1,6-hexanediol, 2-ethyl-1, 3-hexanediol, 1,2-hexanediol and 2,5-hexanediol, dipropylene glycol monomethyl ether, dipropylene glycol n-propyl ether, tripropylene glycol methyl ether, tripropylene glycol n-propyl ether, propylene glycol phenyl ether, propylene glycol n-butyl ether, propylene glycol t-butyl ether, diethylene glycol methyl ether, ethylene glycol n-propyl ether, triethylene glycol methyl ether, triethylene glycol ethyl ether, diethylene glycol n-hexyl ether and ethylene glycol phenyl ether, 2-pyrrolidone, N-methylpyrrolidone, N-ethylpyrolidone, 2,5,7,10-tetraoxaundecane (TOU), 1,3-dioxolane, 1-(2-Butoxy-1-methylethoxy)-2-propanol (solvenol DPnB) or 1(or 2)-(2-Butoxymethylethoxy)propanol (Dowanol DPnB), butyldiglycol, N,N-dimethyl lactamide, 3-methoxy N,N-dimethylpropionamide, 3-methoxy-3-methyl-1-butanol (MMB) and alpha-methyl-gamma-butyrolactone (MBL).

Surfactants

The aqueous inkjet inks preferably contain at least one surfactant. The surfactant(s) can be anionic, cationic, nonionic, or zwitter-ionic and are usually added in a total quantity less than 1.0 wt % based on the total weight of the inkjet ink and particularly in a total quantity less than 0.3 wt % based on the total weight of the inkjet ink. The total quantity above is expressed as dry solids.

Suitable surfactants for the aqueous inkjet inks include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluorine-based surfactants, such as fluorinated hydrocarbons.

Suitable examples of anionic fluorosurfactant include Capstone™ FS-63, Capstone™ FS-61 (manufactured by DU PONT), Ftergent™ 100, Ftergent™ 110, and Ftergent™ 150 (manufactured by Neos Co. Ltd.); and Chemguard™ S-760P (manufactured by Chemguard, Inc.).

A particularly preferred commercial fluorosurfactant is Capstone™ FS3100 from DU PONT.

In a preferred embodiment of the aqueous inkjet ink, the surfactant is a fluorosurfactant, more preferably an alkoxylated fluorosurfactant, and most preferably an alkoxylated fluorosurfactant containing a sulfonic acid group or a salt thereof.

Particularly preferred is an alkoxylated fluorosurfactant according to Formula (F-I):

Formula (F-I)

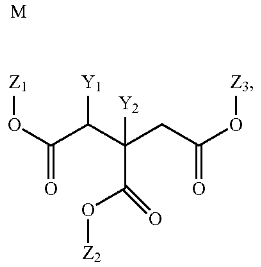

wherein $Z_1$, $Z_2$ and $Z_3$ are, independently of one another, groups of the structure $R(O(CR_1R_2)_c-(CR_3R_4)_d)_e-$, branched alkyl groups, or unbranched alkyl groups, with the proviso that at least one of $Z_1$, $Z_2$ and $Z_3$ represents a group of the structure $R(O(CR_1R_2)_c-(CR_3R_4)_d)_e-$;

indices c and d are, independently of one another, 0 to 10, with the proviso that c and d are not simultaneously 0;

e is 0 to 5;

R is a branched or unbranched, fluorine-containing alkyl radical;

$R_1$ to $R_4$ are, independently of one another, hydrogen, a branched alkyl group, or an unbranched alkyl group;

Y1 is an anionic polar group and Y2 is a hydrogen atom, or vice versa; and

X is a cation, preferably a cation selected from the group $Na^+$, $Li^+$, $K^+$ and $NH_4^+$.

In a preferred embodiment, R1 to R3 represents hydrogen and R4 represents a methyl group, and more preferably the anionic polar group is a sulfonic acid group or a salt thereof.

Particularly preferred examples of alkoxylated fluorosurfactants according to Formula (F-I) are shown in Table 1.

TABLE 1

| | |
|---|---|
| FS-1 | 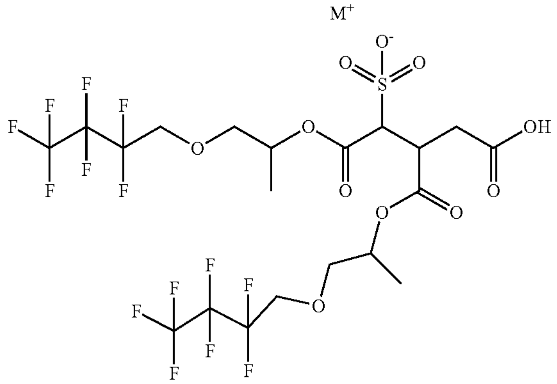 |
| FS-2 | 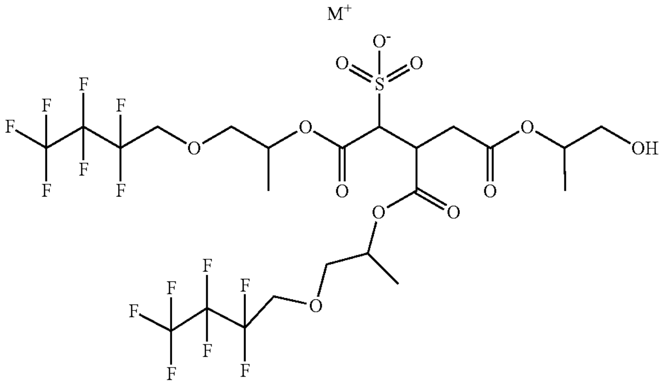 |

TABLE 1-continued

FS-3

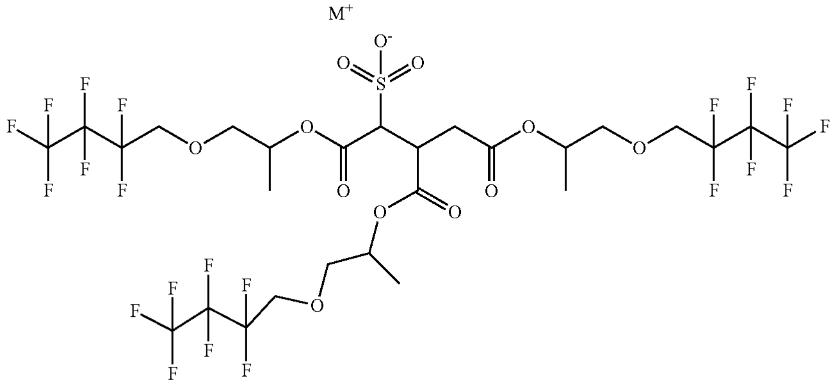

FS-4

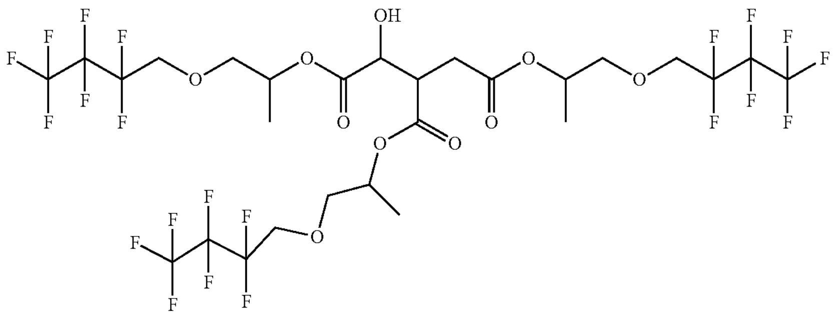 [SMILES: CC(COCC(F)(F)C(F)(F)C(F)(F)F)OC(=O)CC(C(=O)OC(C)COCC(F)(F)C(F)(F)C(F)(F)F)C(O)C(=O)OC(C)COCC(F)(F)C(F)(F)C(F)(F)F]

Biocides

Suitable biocides for the aqueous inkjet inks used in the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL, Proxel™ K and Proxel™ Ultra 5 available from ARCH UK BIOCIDES and Bronidox™ available from COGNIS.

A particularly preferred biocide is a 1,2-benzisothiazolin-3-one based biocide.

A biocide is preferably added in an amount of 0.001 to 3.0 wt %, more preferably 0.01 to 1.0 wt %, each based on the total weight of the aqueous inkjet ink.

pH-Adjusting Agents

It is preferable that the ink has a pH of 7.5 or higher at 25° C., from the viewpoint of dispersion stability.

The aqueous inkjet ink may contain at least one pH adjuster. Suitable pH adjusters include NaOH, KOH, $NEt_3$, $NH_3$, HCl, $HNO_3$, $H_2SO_4$ and (poly)alkanolamines such as triethanol amine and 2-amino-2-methyl-1-propanol.

Preferred pH adjusters are triethanol amine, NaOH and $H_2SO_4$.

The pH is preferably adjusted to a value between 7.5 and 10.0, more preferably between 8.0 and 9.0; the latter pH range has been observed to result in improved ink stability and optimal compatibility with the piezoelectric inkjet print heads.

Other Components

The ink may include other components as necessary, in addition to the components described above.

Examples of the other components include known additives such as a discoloration inhibitor, an emulsion stabilizer, a penetration enhancer, an ultraviolet absorber, an antiseptic agent, an antifungal agent, a viscosity adjusting agent, a rust inhibitor, and a chelating agent.

Preferred UV absorbers include benzophenone compounds, benzotriazole compounds, salicylic acid ester compounds, hydroxyphenyltriazine compounds.

Manufacturing of Inkjet Inks

The pigmented aqueous inkjet inks may be prepared by precipitating or milling the colour pigment in a dispersion medium in the presence of the polymeric dispersant, or simply by mixing a self-dispersible colour pigment in the ink.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

If the inkjet ink contains more than one pigment, the colour ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind may vary depending upon the specific pigments. The contents of the milling mixture comprise the mill grind and the milling media. The mill grind comprises pigment, dispersant and a liquid carrier, preferably water. For aqueous ink-jet inks, the pigment is usually present at 10 to 30 wt % in the mill grind, excluding the milling media. The weight ratio of pigment over dispersant is preferably 20:1 to 1:2.

The milling time can vary widely and depends upon the pigment, selected mechanical means and residence conditions, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general, it is desirable to make the colour ink in the form of a concentrated mill grind, which is subsequently diluted to the appropriate concentration for use in the ink-jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, colour, hue, saturation density, and print area coverage for the particular application. Viscosity can also be adjusted by using low molecular weight polyethylene glycols, for example having an average numerical molecular weight between 200 and 800. An example is PEG 200 from CLARIANT.

Ink Receiving Layers

In the manufacturing method according to the invention, the paperliner board (23) is provided with an ink receiving layer.

In a preferred embodiment, this ink receiving layer is applied just prior to inkjet printing. The application of the liquid for forming the ink receiving layer (ink receiver liquid) can be carried out by any known method such as a coating method, a flexographic printing method or an inkjet method. Coating can be performed according to a known coating method of using a bar coater, an extrusion die coater, an air doctor coater, a blade coater, a rod coater, a knife coater, a squeeze coater, a reverse roll coater, or a bar coater. However, preferably the ink receiver liquid is applied by flexographic printing.

The ink receiver liquid preferably has a composition that when brought into contact with the ink on the paper liner board, the components in the ink aggregate on the paper liner board, thereby suppressing penetration of the ink into the paper liner board, which is beneficial for image quality.

In a preferred embodiment, the ink receiver liquid includes compounds to induce aggregation of ink components, such as acidic compounds and multivalent cationic compounds.

Suitable acidic compounds are compounds that can lower the pH of the ink.

Regarding the acidic compound, any of an organic acidic compound and an inorganic acidic compound may be used, and two or more kinds of compounds selected from organic acidic compounds and inorganic acidic compounds may be used in combination.

The organic acidic compound may be an organic compound having an acidic group. Examples of the acidic group include a phosphoric acid group, a phosphonic acid group, a phosphinic acid group, a sulfuric acid group, a sulfonic acid group, a sulfinic acid group, and a carboxyl group. The acidic group is preferably a phosphoric acid group or a carboxyl group, and more preferably a carboxyl group, from the viewpoint of the aggregation rate of the ink.

Preferred examples of the organic compound having a carboxyl group (organic carboxylic acid) include polyacrylic acid, acetic acid, glycolic acid, malonic acid, malic acid (preferably, DL-malic acid), maleic acid, ascorbic acid, succinic acid, glutaric acid, fumaric acid, citric acid, tartaric acid, phthalic acid, 4-methylphthalic acid, lactic acid, pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, derivatives of these compounds, and salts thereof (for example, polyvalent metal salts). These compounds may be used singly, or two or more kinds thereof may be used in combination.

Regarding the organic carboxylic acid, from the viewpoint of the aggregation rate of the ink, it is preferable to use a divalent or higher-valent carboxylic acid, also referred to as polyvalent carboxylic acid. More preferably the ink receiving layer includes at least one selected from the group consisting of malonic acid, malic acid, maleic acid, succinic acid, glutaric acid, fumaric acid, tartaric acid, 4-methylphthalic acid, and citric acid; and even more preferably includes at least one selected from the group consisting of malonic acid, malic acid, tartaric acid, and citric acid. It is preferable that the organic acidic compound has a low pKa value.

Suitable inorganic acidic compounds include phosphoric acid, nitric acid, nitrous acid, sulfuric acid, and hydrochloric acid; however, the inorganic acidic compound is not particularly limited to these. Regarding the inorganic acidic compound, phosphoric acid is most preferred from the viewpoint of the aggregation rate of the ink.

In a more preferred embodiment, the ink receiving layer includes a polyvalent metal salt.

Preferred examples of the polyvalent metal salt include salts of any of alkaline earth metals belonging to Group II of the periodic table (e.g., magnesium and calcium) and cations from Group XIII of the periodic table (e.g., aluminum). As salts of the metals, carboxylic acid salt (formate, acetate, benzoate, etc.), nitrate, chlorides, and thiocyanate are preferable. In particular, calcium salts or magnesium salts of carboxylic acids (e.g., formate, acetate, and benzoate), calcium salts or magnesium salts of nitric acid, calcium chloride, magnesium chloride, and calcium salts or magnesium salts of thiocyanic acid are preferable.

The content of the acidic compound and/or polyvalent metal salt is preferably 30 to 80 wt %, more preferably 40 to 60 wt % based on the total dry weight of the ink receiving layer.

For reliable handling, the ink receiving layer preferably contains a binder. The binder is preferably a polymer or copolymer based on polyvinylalcohol.

A preferred polymer for the ink receiving layer is a polyvinylalcohol (PVA), a vinylalcohol copolymer or modified polyvinyl alcohol. The modified polyvinyl alcohol may be a cationic type polyvinyl alcohol, such as the cationic polyvinyl alcohol grades from Kuraray, such as POVAL™ C506, POVAL™ C118 from Nippon Goshei.

Other suitable binders for the ink receiving layer include a polymeric binder selected from the group consisting of hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxethyl cellulose; water soluble ethylhydroxyethyl cellulose; cellulose sulfatepolyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinyl-methyl ether/maleic acid copolymer; poly (2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; ether bond-containing polymers such as polyethylene oxide (PEO), polypropylene oxide (PPO), polyethylene glycol (PEG) and polyvinyl ether (PVE); polyurethane; melamine resins; gelatin; carrageenan; dextran; gum arabic; casein; pectin; albumin; chitins; chitosans; starch; collagen derivatives; collodion and agar-agar In a particularly preferred embodiment of the manufacturing method, the ink receiving layer contains a polymer or copolymer based on polyvinylalcohol and a polyvalent inorganic salt, preferably $CaCl_2$), $Mg(NO_3)_2$ or $Ca(NO_3)_2$. It was found that excellent results for image quality were obtained for that combination.

The ink receiving layer preferably contains a compound for cross-linking the polymer of the ink receiving layer. The cross-linker is preferably included in an amount between 5 and 10 wt % based on the total weight of the polymer in the ink receiving layer. A preferred cross-linker is boric acid, especially in combination with a polyvinylalcohol.

In the manufacturing method according to the invention, the dry weight of the ink receiving layer is preferably less than 0.8 g/m$^2$, more preferably between 0.1 and 0.6 g/m$^2$. This is not only cost-effective, but also provides no noticeable relief on the corrugated card board causing an undesired tactile effect.

The viscosity of the ink receiver liquid is preferably in the range of 1 mPa·s to 20 mPa·s, and more preferably in the range of 1 mPa·s to 10 mPa·s, from the viewpoint of the aggregation rate of the ink.

The surface tension at 25° C. of the ink receiver liquid is preferably 20 mN/m to 50 mN/m, and even more preferably 30 mN/m to 45 mN/m. When the surface tension is in the range described above, it is advantageous because the occurrence of coating unevenness is suppressed.

Protective Varnish Layers

The inkjet printed image can be protected by lamination of a transparent foil. However, preferably a protective varnish layer is applied onto the inkjet printed image. This brings advantages in productivity. For example, the protective varnish layer need only be applied in that area where an inkjet printed image is present.

The protective varnish layer is preferably applied after inkjet printing. The application of the protective varnish layer can be carried out by any known method such as a coating method, a flexographic printing method or an inkjet method. Coating can be performed according to a known coating method of using a bar coater, an extrusion die coater, an air doctor coater, a blade coater, a rod coater, a knife coater, a squeeze coater, a reverse roll coater, or a bar coater. However, preferably the protective varnish is applied by flexographic printing, as it was found to be the most economical way.

Preferred polymers used in the protective varnish layer are polyurethane based polymers, preferably as a polymeric dispersion such as a self-dispersing polyurethane latex.

Suitable protective varnish layers are well-known to the skilled person as so-called overprint varnishes are already frequently used in flexographic printing of corrugated cardboard.

The protective varnish layers may be made with UV curable overprint varnishes, but are preferably water-based overprint varnishes.

Suitable examples include Digiguard™ 520 IJ from MICHELMAN, TP-Unilac™ high gloss OPV and Unilac™ Postprint Glossy OPV from SIEGWERK.

The dry weight of the protective varnish layer is preferably between 0.5 and 4.0 g/m$^2$, more preferably 1.0 to 3.0 g/m$^2$. The presence of the protective varnish layer in such a range is generally sufficient to maintain the image quality by preventing scratches to the image.

Inkjet Printers

The piezoelectric through-flow print heads are incorporated in an inkjet printer. The aqueous inkjet inks are jetted by these print heads ejecting small droplets in a controlled manner through nozzles onto a substrate, which is moving relative to the print heads. In a multi-pass inkjet printing process, the inkjet print head scans back and forth in a transversal direction across the moving ink-receiver surface. Sometimes the inkjet print head does not print on the way back. However, bi-directional printing is preferred for productivity. However, for optimal productivity, printing is preferably performed by a single pass printing process. This can be executed by using page wide inkjet print heads or multiple staggered inkjet print heads, which cover the entire width of the ink-receiving surface. In a single pass printing process, the inkjet print heads usually remain stationary while the substrate surface is transported under the inkjet print heads. Preferably multiple staggered inkjet print heads are used, as this is more cost-effective than page wide inkjet print heads when a print head contains one or more failing nozzles and has to be replaced.

In a preferred embodiment of the invention, the inkjet printer is a single pass inkjet printing device including the above described combination of piezoelectric through-flow print heads having nozzles with an outer nozzle surface area NS smaller than 500 μm$^2$ and the above described aqueous inkjet inks.

A dryer may be included in the inkjet printing device for removing at least part of the aqueous dispersion medium. Suitable dryers include devices circulating hot air, ovens, infrared dryers, and devices using air suction.

Preferred drying devices use Carbon Infrared Radiation (CIR) or include a NIR source emitting Near Infrared Radiation. NIR-radiation energy quickly enters into the depth of the inkjet ink layer and removes water and solvents out of the whole layer thickness, while conventional infrared and thermo-air energy predominantly is absorbed at the surface and slowly conducted into the ink layer, which results usually in a slower removal of water and solvents.

An effective infrared radiation source has an emission maximum between 0.8 and 1.5 μm. Such an infrared radiation source is sometimes called a NIR radiation source or NIR dryer. Preferably the NIR radiation source is in the form of NIR LEDs, which can be mounted easily in the neighbourhood the inkjet print heads due to its compact size.

EXAMPLE

Materials

All materials used in the following examples were readily available from standard sources such as Aldrich Chemical Co. (Belgium) and Acros (Belgium) unless otherwise specified. Where used, water is demineralised water.

PB15:3 is an abbreviation used for Sunfast™ Blue 15:3, a C.I. Pigment Blue 15:3 pigment from SUN CHEMICAL.

PR122 is an abbreviation used for INK JET MAGENTA E 02, a C.I. Pigment Red 122 pigment from CLARIANT.

PY151 is an abbreviation used for Ink yet yellow $H_4G$ LV 3853, a C.I. Pigment Yellow 151 pigment from CLARIANT.

PBL7 is an abbreviation used for Printex™ 60, a carbon black pigment from EVONIK.

Edaplan is an abbreviation used for Edaplan™ 482, a polymeric dispersant from MUNZING.

Joncryl is an abbreviation used for Joncryl™ 8078, a polymeric dispersant from JOHNSON POLYMER B.V.

Tegowet is an abbreviation used for Tegowet™ 270, a polyethersiloxane surfactant from EVONIK.

PEG 200 is a polyethylene glycol having an average molecular weight of 200 from CLARIANT.

TEA is triethanol amine.

Proxel is an abbreviation used for a 5% aqueous solution of 1,2-benzisothiazolin-3-one available as Proxel™ K from YDS CHEMICALS NV.

PVA is a polyvinylalcohol solution available as PVA56-98-sol from UNILIN.

Measurement Methods

1. Average Particle Size

An ink sample is diluted with demineralized water to a pigment concentration of 0.002 wt %. The numeric average particle size of pigment particles is determined with a Nicomp™ 380 Particle Sizing System based upon the principle of dynamic light scattering using a laser having an emission wavelength of 633 nm and measured under a scattering angle of 90 degrees.

2. Viscosity

The viscosity of an inkjet ink was measured, using a Brookfield DV-II+ viscometer at 32° C. at a shear rate of 1,000 $s^{-1}$.

3. Outer Nozzle Surface Area

The dimensions of a nozzle aperture on the nozzle plate of a print head were determined using a SMZ1500 stereo microscope from NIKON at a zoom ratio of 11.25×. An average from the dimensions determined for ten nozzles was taken. The nozzle dimensions determined are those necessary to calculate the outer nozzle surface area. For example, the nozzle diameter was determined for a circular nozzle, while for a rectangular nozzle both the length and the width were measured.

4. Short Term Latency

The short term latency was determined with the "latency option" of a JetXpert™ that allows to measure the drop velocity and drop volume of a specific targeted ink drop in a series of ink drops ejected by a print head. The drop velocity of a second ink drop was determined for a printing idle time of 0.5 s and of 1.0 s. The print head was set with the appropriate voltage and ink temperature in order to achieve a steady-state drop velocity of 6 m/s. A loss in drop velocity for the second ink drop of less than 20% is considered as a good short term latency.

5. Mist Formation

The mist formation was visually evaluated in a printing experiment where all nozzles were firing ink droplets at 8 kHz in 1dpd printing mode. Mist is created by trailing ink droplets that have a too low drop velocity for forming satellites in a printed image, but instead form a "cloud of ink droplets" around the nozzle plate of the print head.

6. Average Drying Speed

A glass container having a diameter of 5 cm was filled with 100 g of aqueous inkjet ink, weighed and put into a ventilated oven at 60° C. After a first period of drying time of 1800 s, the glass container was weighed again and the loss in weight Δwt %(1) was noted. The same glass container was put back into the oven for another 9000 s, then was weighed again and the loss in weight Δwt %(2) was noted.

The average drying speed ADS was calculated according to Formula (2) and expressed in wt % loss per second:

$$ADS = \frac{\Delta wt\ \%\ (2) - \Delta wt\ \%\ (1)}{9000\ \text{s}}. \qquad \text{Formula (2)}$$

For an acceptable drying speed in a single pass inkjet printing device without an oversized dryer, the ADS should be larger than 0.0025 wt % loss per second.

Example 1

This example illustrates the reliability of an aqueous inkjet ink used in a piezoelectric through-flow print head having an outer nozzle surface area NS smaller than 500 $\mu m^2$. The invention is illustrated for a cyan ink composition containing a beta-copper phthalocyanine pigment and a water content in the range defined by Formula (I).

Preparation of Concentrated Pigment Dispersion

The concentrated aqueous pigment dispersion was prepared made by mixing a composition according to Table 2 for 30 minutes with a Disperlux™ mixer.

TABLE 2

| wt % of component | CP-1 |
|---|---|
| PB15:3 | 15.00 |
| Edaplan | 15.00 |
| Water | 70.00 |

The concentrated pigment dispersion was then milled using a Dynomill™ KDL with 0.4 mm yttrium stabilized zirconium beads YTZ™ Grinding Media (available from TOSOH Corp.). The mill was filled to half its volume with the grinding beads and the dispersion was milled for 3 hours at flow rate of 200 mL/min and a rotation speed of 15 m/s. After milling, the dispersion is separated from the beads. The resulting concentrated pigment dispersion CP-1 served as the basis for the preparation of respectively the aqueous cyan inkjet inks. The average particle diameter APD was 138 nm.

Preparation of the Cyan Inkjet Inks

Using the concentrated pigment dispersion CP-1, four cyan aqueous inkjet inks Ink-1 to Ink-4 were prepared according to Table 3 in order to have a different amount in water and organic solvent PEG200.

TABLE 3

| wt % of component | Ink-1 | Ink-2 | Ink-3 | Ink-4 |
|---|---|---|---|---|
| PB15:3 | 2.20 | 2.20 | 2.20 | 2.20 |
| Edaplan | 2.20 | 2.20 | 2.20 | 2.20 |
| Proxel | 0.20 | 0.20 | 0.20 | 0.20 |
| 1,2-hexanediol | 3.00 | 3.00 | 3.00 | 3.00 |
| Glycerol | 20.00 | 20.00 | 20.00 | 10.00 |
| PEG200 | 14.00 | 33.00 | 24.00 | 14.00 |
| Water | 58.10 | 39.10 | 48.10 | 68.10 |
| TEA | 0.30 | 0.30 | 0.30 | 0.30 |

Evaluation and Results

After determining the outer nozzle surface area NS with a microscope, the following combinations of print head and inkjet ink listed in Table 4 were evaluated. An end shooter piezoelectric print head is identified with END, while a through-flow piezoelectric print head is identified with TF.

TABLE 4

| Combination | Print head | Type | NS ($\mu m^2$) | Ink | wt % of water |
|---|---|---|---|---|---|
| COMP-1 | Ricoh ™ Gen5 | END | 616 | Ink-2 | 39.10 |
| COMP-2 | Ricoh ™ Gen5S | END | 380 | Ink-2 | 39.10 |

TABLE 4-continued

| Combination | Print head | Type | NS ($\mu m^2$) | Ink | wt % of water |
|---|---|---|---|---|---|
| COMP-3 | Ricoh ™ Gen5S | END | 380 | Ink-3 | 48.10 |
| COMP-4 | Ricoh ™ Gen5S | END | 380 | Ink-1 | 58.10 |
| COMP-5 | Samba ™ G5L | TF | 486 | Ink-1 | 58.10 |
| COMP-6 | Samba ™ G3L HF | TF | 240 | Ink-4 | 68.10 |
| COMP-7 | Samba ™ G3L HF | TF | 240 | Ink-2 | 39.10 |
| INV-1 | Samba ™ G5L | TF | 486 | Ink-3 | 48.10 |
| INV-2 | Samba ™ G3L HF | TF | 240 | Ink-1 | 58.10 |
| INV-3 | Samba ™ G3L HF | TF | 240 | Ink-3 | 48.10 |

The combinations of print head and aqueous inkjet ink of Table 4 were evaluated for short term latency and mist formation. The average drying speed for the aqueous inkjet inks Ink-1 to Ink-4 was determined and is shown in Table 5.

TABLE 5

| | Short term Latency | | Mist | Average drying speed |
|---|---|---|---|---|
| Combination | 0.5 s | 1.0 s | Formation | (wt % loss/s) |
| COMP-1 | <20% | <20% | No | 0.0017 |
| COMP-2 | >20% | >20% | No | 0.0017 |
| COMP-3 | >20% | >20% | No | 0.0030 |
| COMP-4 | No stable jetting | | Yes | 0,0035 |
| COMP-5 | No stable jetting | | Yes | 0.0035 |
| COMP-6 | No stable jetting | | Yes | 0.0049 |
| COMP-7 | <20% | <20% | Yes | 0.0017 |
| INV-1 | <20% | <20% | No | 0.0030 |
| INV-2 | <20% | <20% | No | 0.0035 |
| INV-3 | <20% | <20% | No | 0.0030 |

From Table 5, it can be seen that only the combinations INV-1 to INV-3 in accordance with the invention achieved good short term latency, exhibited no mist formation and possessed a good average drying speed.

It should be clear that, unless the functional relation on water content of Formula (I) is known, it is difficult to design an inkjet printing device with a combination of print head and ink providing good printing reliability in an economical manner. For example, the combinations COMP-3, INV-1 and INV-3 all used the same ink Ink-3 containing 48.1 wt % of water. The end shooter print head of COMP-3 had an outer nozzle surface area in between that of the through-flow heads of INV-1 and INV-3, yet failed in short term latency by having a drop velocity of less than 1 m/s for the second drop at 0.5 s and 1.0 s printing idle time. The combinations INV-1 and INV-3 both had a drop velocity of 5.7 m/s at 0.5 s printing idle time, while they had a drop velocity of 5.5 m/s respectively 5.1 m/s at 1.0 s printing idle time. If the water content is increased too much, then the jetting becomes unstable as illustrated by combination COMP-5 versus INV-1 and combination COMP-6 versus INV-3. Replacing too much water in the ink of combination INV-3 by organic solvent results in mist formation and unacceptable drying speed as shown by combination COMP-7, although the short term latency could be maintained (drop velocity of 5.6 m/s at 0.5 s printing idle time and of 5.0 m/s at 1.0 s printing idle time). For the sake of completeness, the viscosity of the inkjet inks Ink-1 and Ink-3 used in the combinations INV-1 to INV-3 was determined to be 3.5 mPa·s, respectively 5.5 mPa·s at 32° C. and at a shear rate of 1,000 $s^{-1}$.

Example 2

This example illustrates an aqueous inkjet ink set suitable for reliably printing colour images exhibiting high image quality on corrugated cardboard.

Preparation of Concentrated Pigment Dispersions CPK, CPC, CPM and CPY

The concentrated pigment dispersions CPC, CPM, CPY and CPK were prepared in the same manner as described for the concentrated pigment dispersion CP-1 in EXAMPLE 1, except that a composition according to Table 6 was used.

TABLE 6

| wt % of component | CPC | CPM | CPY | CPK |
|---|---|---|---|---|
| PB15:3 | 15.0 | — | — | — |
| PR122 | — | 15.0 | — | — |
| PY151 | — | — | 15.0 | — |
| PB7 | — | — | — | 15.0 |
| Edaplan 482 | 7.5 | 15.0 | 12.5 | — |
| Joncryl8078 | — | — | — | 10.0 |
| Water | 77.5 | 70.0 | 62.5 | 70.0 |

Preparation of Aqueous Inkjet Ink Set

The concentrated pigment dispersions CPC, CPM, CPY and CPK were then used for preparing the corresponding inkjet inks C, M, Y and K in the same manner by diluting the concentrated pigment dispersions with the other ink ingredients according to Table 7. The wt % is based on the total weight of the ink.

TABLE 7

| wt % of component | InkC | InkM | InkY | InkK |
|---|---|---|---|---|
| PB15:3 | 3.0 | — | — | — |
| PR122 | — | 3.0 | — | — |
| PY151 | — | — | 3.0 | — |
| PB7 | — | — | — | 3.0 |
| Edaplan | 1.5 | 3.0 | 1.5 | 0.0 |
| Joncryl | — | — | — | 1.5 |
| Water | 47.4 | 45.9 | 47.4 | 47.4 |
| Tegowet | 0.1 | 0.1 | 0.1 | 0.1 |
| Glycerol | 29.0 | 29.0 | 29.0 | 29.0 |
| Ethylene glycol | 11.0 | 11.0 | 11.0 | 11.0 |
| 2-Pyrrolidone | 8.0 | 8.0 | 8.0 | 8.0 |

Preparation of Ink Receiving Layer

A coating composition COAT-1 was prepared having a composition according to Table 8.

TABLE 8

| wt % of component | COAT-1 |
|---|---|
| PVA | 52.98 |
| $CaCl_2$ | 4.64 |
| Boric acid | 6.00 |
| Water | 36.38 |

Evaluation and Result

The jetting performance of all inkjet inks was tested on a JetXpert™ drop watcher equipped with a Samba™ G3L inkjet print head (NS=240 $\mu m^2$) from FUJIFILM DIMATIX Inc. Stable jetting for 5 minutes of a 100% ink coverage was observed for all inkjet ink sets at 20, 40 and 60 kHz.

The coating composition COAT-1 was applied to a white Fusion™ top liner from SAPPI at a 4 μm wet layer thickness. The coating was dried in an oven at 60° C. resulting in ink receiving layer having a dry weight thickness of 0.36 $g/m^2$. An image was printed on the ink receiving layer with the CMYK inkjet inks of Table 7 using Samba™ G3L inkjet print heads.

REFERENCE SIGNS LIST

The reference signs used in the drawings are listed in Table 9.

TABLE 9

| | |
|---|---|
| 1 | Fluted paperboard |
| 2 | Paper linerboard |
| 3 | Paper linerboard |
| 4 | Glue |
| 10 | Print head wall |
| 11 | Ink ejection |
| 12 | Ink inlet |
| 13 | Ink outlet |
| 14 | Ink channel |
| 15 | Nozzle plate |
| 16 | Nozzle |
| 17 | Ejected ink droplet |
| 18 | Inner nozzle diameter |
| 19 | Outer nozzle diameter |
| 20 | Single wall corrugated cardboard |
| 21 | Fluted paperboard |
| 22 | Paper linerboard |
| 23 | Paper linerboard |
| 24 | Flexographic printing roll for ink receiving layer |
| 25 | Inkjet print heads |
| 26 | Flexographic printing roll for protective varnish layer |
| 27 | Inkjet printed paper linerboard |
| 28 | Single face corrugated cardboard |
| 29 | Lamination rollers |

The invention claimed is:

1. A manufacturing method of printed corrugated cardboard comprising the steps of:

a) providing a paper liner board with an ink-receiving layer; and b) inkjet printing an image with one or more pigmented aqueous inkjet inks on the ink receiving layer using piezoelectric through-flow print heads having nozzles with an outer nozzle surface area NS smaller than 500 $\mu m^2$;

wherein the one or more pigmented aqueous inkjet inks contain water in an amount of A wt % defined by Formula (I):

$$100 \text{ wt } \%-\text{sqrt}(NS)\times 3.8 \text{ wt } \%/\mu m \leq A \text{ wt } \% \leq 100 \text{ wt } \%-\text{sqrt}(NS)\times 2.2 \text{ wt } \%/\mu m \quad \text{Formula (I)}$$

wherein the wt % is based on the total weight of the aqueous inkjet ink;

wherein sqrt(NS) represents the square root of the outer nozzle surface area NS;

wherein A wt %≥40 wt %; and wherein the dry weight of the ink-receiving layer is less than 0.8 $g/m^2$.

2. The manufacturing method of claim 1, further comprising a step c) of laminating inkjet printed paper linerboard onto a fluted paperboard of a corrugated cardboard.

3. The manufacturing method of claim 1, wherein the inkjet printing is performed according to a single pass printing process.

4. The manufacturing method of claim 1, wherein the ink-receiving layer contains a polymer or copolymer based on polyvinylalcohol and a polyvalent metal salt.

5. The manufacturing method of claim 1, including a step of applying a protective varnish layer on the inkjet printed image.

6. The manufacturing method of claim 1, wherein the ink-receiving layer and/or the protective varnish layer are applied by flexographic printing.

7. The manufacturing method of claim 1, wherein the outer nozzle surface area NS is smaller than 300 $\mu m^2$.

8. The manufacturing method of claim 1, wherein the one or more aqueous inkjet inks have a viscosity between 3.0 and 8.0 mPa·s at 32° C. at a shear rate of 1,000 $s^{-1}$.

9. The manufacturing method of claim 1, wherein the paper liner board is provided in the form of a roll.

10. The manufacturing method of claim 1, wherein the pigmented aqueous inkjet inks include:

a) a cyan aqueous inkjet ink containing a beta-copper phthalocyanine pigment;

b) a magenta or red aqueous inkjet ink containing a pigment selected from the group consisting of C.I. Pigment Red 57/1, C.I. Pigment Red 122, C.I. Pigment Violet 19, and mixed crystals thereof;

c) a yellow aqueous inkjet ink containing a pigment selected from C.I. Pigment Yellow 74, C.I. Pigment Yellow 138, C.I. Pigment Yellow 151, and mixed crystals thereof; and d) a black aqueous inkjet ink containing a carbon black pigment.

11. The manufacturing method of claim 1, wherein the paper liner board has a white colour.

12. The manufacturing method of claim 1, wherein the printed corrugated cardboard is a single wall or double corrugated cardboard.

* * * * *